United States Patent [19]

van de Griend

[11] Patent Number: 4,490,637
[45] Date of Patent: Dec. 25, 1984

[54] ELECTRICAL MACHINE WITH MULTI DISC COMMUTATOR

[75] Inventor: Jan M. van de Griend, Dordrecht, Netherlands

[73] Assignee: U.S. Philips Corporation, New York, N.Y.

[21] Appl. No.: 535,012

[22] Filed: Sep. 23, 1983

[30] Foreign Application Priority Data

Oct. 18, 1982 [NL] Netherlands .................... 8204002

[51] Int. Cl.³ ................ H01R 39/06; H02K 13/04
[52] U.S. Cl. .................................. 310/237; 310/234; 310/268
[58] Field of Search ............ 310/368, 237, 234, 233, 310/235, 71

[56] References Cited

U.S. PATENT DOCUMENTS

| Re. 25,305 | 12/1962 | Haydon | 310/237 X |
|---|---|---|---|
| 3,521,101 | 7/1970 | Arora | 310/237 X |
| 3,790,835 | 2/1974 | Takeda | 310/237 X |
| 4,099,077 | 7/1978 | Maekawa | 310/237 |
| 4,374,336 | 2/1983 | Shimizu | 310/71 X |

Primary Examiner—Mark O. Budd
Attorney, Agent, or Firm—Robert S. Smith

[57] ABSTRACT

The invention relates to an electrical machine comprising a rotor provided with coils, which rotor comprises a commutator having a commutator disk whose surface is provided with segments, an end of each being connected to a corresponding plurality of said segments. The commutator comprises an assembly of connecting elements which are insulated from one another, the assembly being arranged adjacent the commutator disk in the axial direction and the number of elements corresponding to the number of coils. The coil ends are connected to the connecting elements and each connecting element is provided with lugs for the electrical connection of the connecting element to a plurality of segments, which lugs bridge the axial distance from the connecting element to the segments.

5 Claims, 4 Drawing Figures

ELECTRICAL MACHINE WITH MULTI DISC COMMUTATOR

The invention relates to an electrical machine comprising a rotor with coils, which rotor is provided with a commutator having a commutator disk, a surface of which is provided with segments, one end of each coil being connected to a corresponding plurality of said segments.

Such an electrical machine is known, for example from DE-OS 1,638,247. Especially in small motors in which the ratio between the number of segments and the number of coils is large the connection of the coil ends to the segments is a tedious, time-consuming and therefore expensive manual operation.

The construction in accordance with the invention is simpler and cheaper to manufacture and is characterized in that the commutator comprises an assembly of connecting elements which are insulated from one another, the assembly being arranged adjacent the commutator disk in the axial direction and the number of elements corresponding to the number of coils, an end of each coil being connected to a corresponding one of the connecting elements and the commutator being provided with lugs for the electrical connection of each connecting element to a corresponding plurality of said segments, which lugs bridge the axial distances between the segments and the connecting elements.

Generally, a coil end now has to be connected only once to the commutator.

Moreover, this construction is particularly suitable for automated manufacture.

A preferred embodiment is characterized in that each connecting element takes the form of an annular part made of a sheet material and formed integrally with said lugs, which are regularly spaced around the circumference of the connecting element.

A special embodiment is characterized in that one of the lugs of each connecting element extends in a radial direction and forms a connecting strip for a coil end.

An embodiment of the invention will now be described in more detail, by way of example, with reference to the Figures.

Figure 1:
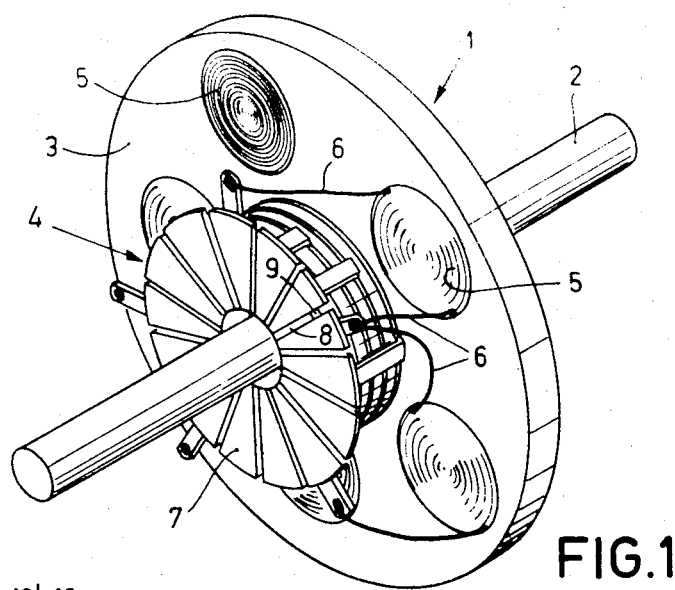
FIG. 1 is a perspective view of a rotor of an electric motor.

The rotor 1 shown in FIG. 1 is a component of an electric motor, not shown, and comprises a spindle 2 with a disk-shaped armature 3 and a commutator 4. The armature is provided with five coils 5 whose ends 6 are connected to the segments 7 on the surface 8 of the commutator disk 9. During operation of the motor the coils 5 are energized alternately in known manner by means of brushes, not shown, which are positioned against the surface 8 and which make contact with successive segments 7.

Figure 2:
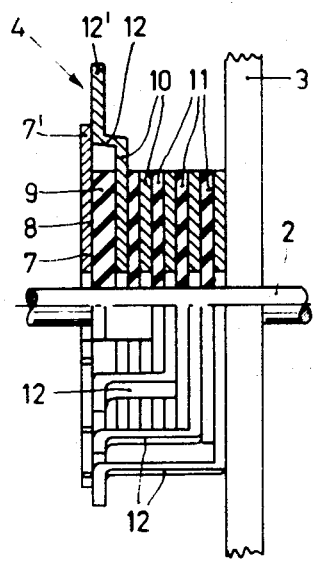
FIG. 2 is a elevational view, partly in section, of the rotor shown in FIG. 1.
Figure 3:
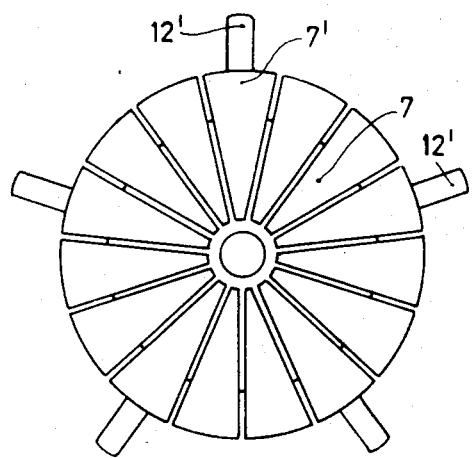
FIG. 3 is front elevational view of the commutator of the rotor shown in FIG. 2.

In addition to the commutator disk 9 the commutator 4 (FIGS. 2 and 3) comprises an assembly of five connecting elements 10 insulated from one another by four spacers 11. The assembly extends axially from the commutator disk 9. The spacers 11 may be for example annular parts made of a plastic foil.

The connecting elements 10 are also substantially annular and are manufactured from an electrically conductive sheet material, for example a copper-alloy sheet material. Each connecting element has three lugs 12 on its outer periphery, which lugs are regularly spaced around the circumference of the connecting element. These lugs 12 bridge the axial distances between the connecting elements 10 and the segments 7 and are connected, for example by spot-welding, to the outer ends 7' of the segments, which ends project beyond the edge of the commutator disk. Each connecting element is thus connected via its three lugs to a corresponding three of the segments 7.

In the embodiment shown in the Figures the ends 6 of two coils 5 may be connected to the radially projecting end 12' of one lug 12, said coil ends thereby being connected directly to three difference segments 7 via the relevant connecting element. Thus, by means of the five connecting elements 10 each of the ten coil ends 6 can be connected to three of the fifteen segments 7, for which each coil end has to be connected to the end 12' of only one lug. This reduction of the number of soldered joints substantially simplifies the manufacture of the commutator and moreover reduces the risk of mistakes when selecting the lug to which a coil end has to be connected.

Figure 4:
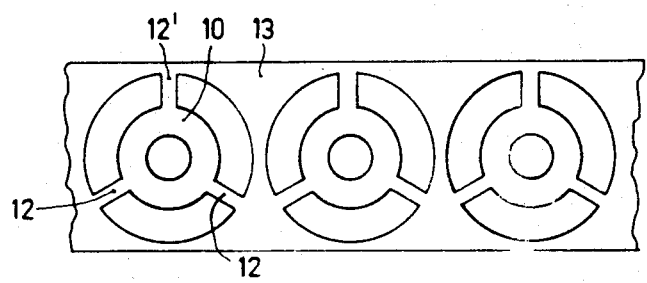
FIG. 4 shows a stage in the manufacture of connecting elements of the commutator shown in the preceding Figures, the elements being shown still attached to a strip of sheet material from which they are manufactured.

The manufacture of a commutator as described in the foregoing can be automated to a high degree. The connecting elements 10, for example, are fed in as shown in FIG. 4 as part of a strip 13 of the sheet material from which they are manufactured. By means of a machine operation, the connecting elements are severed from the strip aligned and formed into stacks with commutator disks and spacers. The ends 12' of the lugs 12 are brought into contact with the ends 7' of the commutator segments by a simple bending operation and are connected to the segments by spot-welding. The radially projecting ends 12' to which no coil end 8 is connected are cut off where they project beyond the outer ends of the segments.

It is obvious that the above construction of a commutator may also be used if the armature has a different shape from that shown and if the numbers of segments, coils and connecting elements are different from the numbers of these parts in the embodiment described.

What is claimed is:

1. An electrical machine comprising a rotor including a plurality of coils, said rotor being provided with a commutator having a commutator disk, said commutator disk having a surface which is provided with segments, one end of each of said coils being connected to a corresponding plurality of said segments, said commutator including an assembly of a plurality of connecting elements which are axially separated by insulation from one another and from said commutator disk, said assembly being disposed axially adjacent said commutator disk, the number of said connecting elements corresponding to the number of coils, an end of each coil being connected to a corresponding one of said connecting elements and said commutator includes lugs for the electrical connection of each of said connecting elements to a plurality of said segments, said lugs bridging an axial separation between said segments and said connecting elements.

2. An electrical machine as claimed in claim 1, wherein each of said connecting elements is an annular part made of a sheet material having integrally formed lugs.

3. An electrical machine as claimed in claim 1 wherein said commutator has lugs disposed at regularly spaced angular intervals about the circumference thereof.

4. An electrical machine as claimed in claim 1 wherein one of said lugs associated with each of said connecting elements extends in a radial direction and forms a connecting strip for an end of one of said coils.

5. An electrical machine as claimed in claim 2 wherein one of said lugs associated with each of said connecting elements extends in a radial direction and forms a connecting strip for an end of one of said coils.

* * * * *